United States Patent [19]

Franke et al.

[11] 4,125,154
[45] Nov. 14, 1978

[54] VESSEL FOR SALT MELTS, PARTICULARLY FOR MODIFYING THE PROPERTIES OF OBJECTS OF GLASS, VITROCRYSTALLINE MATERIAL OR STONEWARE

[75] Inventors: Johannes Franke; Kurt Kessler, both of Jena; Ulrich Kühne, Torgau; Heinz Sauerbier, Camburg; Kurt Schneider; Karl Unbehaun, both of Jena, all of German Democratic Rep.

[73] Assignee: VVB Haushalts- und Verpackungsglas, Weisswasser, German Democratic Rep.

[21] Appl. No.: 597,056

[22] Filed: Jul. 18, 1975

[30] Foreign Application Priority Data

Jul. 31, 1974 [DD] German Democratic Rep. ... 180215

[51] Int. Cl.² ............................ F28F 3/12; F28F 9/22; F26B 3/00
[52] U.S. Cl. .............................. 165/169; 126/343.5 A; 432/210
[58] Field of Search ................. 165/169; 126/343.5 A; 432/210, 211

[56] References Cited

U.S. PATENT DOCUMENTS

| 1,693,249 | 11/1928 | Pauly | 165/169 |
| 2,987,788 | 6/1961 | Lyman | 165/169 X |
| 3,220,403 | 11/1965 | Figge | 126/343.5 A |
| 3,536,047 | 10/1970 | Barratt | 165/169 X |
| 3,628,601 | 12/1971 | Snaper et al. | 165/169 X |
| 3,897,202 | 7/1975 | Ackermann et al. | 432/210 X |

FOREIGN PATENT DOCUMENTS 89,217 12/1972 German Democratic Rep. ... 126/343.5 A

Primary Examiner—Charles J. Myhre
Assistant Examiner—Sheldon Richter
Attorney, Agent, or Firm—Nolte & Nolte

[57] ABSTRACT

A vessel for a molten substance for modifying the properties of objects of glass and similar materials, comprises an inner vessel and an outer vessel with an annular space defined therebetween, an elastic tongue connecting the inner vessel and the outer vessel, means in said space for guiding a heating gas including fins mounted on the inside of the outer vessel which also support the inner vessel and an upright web between the inner vessel and the outer vessel reinforcing the combined vessel structure and separating the hot gas guiding system into discrete sections on opposite sides of the web.

13 Claims, 4 Drawing Figures

VESSEL FOR SALT MELTS, PARTICULARLY FOR MODIFYING THE PROPERTIES OF OBJECTS OF GLASS, VITROCRYSTALLINE MATERIAL OR STONEWARE

The present invention relates to a vessel for hot molten salts, preferably $KNO_3$, $NaNO_3$ and $LiNO_3$, for modifying certain physical and/or chemical properties of objects of glass, vitrocrystalline material or stoneware.

Various devices are already known which are differently designed corresponding to the method to be used for modifying certain physical and/or chemical properties of objects of glass, vitrocrystalline material or stoneware. Thus a device is known from German Offenlegungsschrift No. 1,771,250 for the chemical hardening of objects of glass, where a diffusion of ions into a glass or vitrocrystalline material takes place from a bath of molten salt or molten salts, which contains the following parts. The device comprises a vessel which contains the bath of molten salt or molten salts, which supply the ions for diffusion into the object and into which the object can be dipped and removed again as well as a heating system for maintaining the molten state of the salt or salts.

The known vessel for receiving the molten salt or molten salts consists of a difficultly melting material, for example stainless steel or ceramic material, and contains two spaced carriers to receive the glass objects to be hardened, for example, glass plates or hollow glass bodies.

Different molten salt baths can be contained in the vessel corresponding to the different chemical hardening treatments at different temperatures and by different ion-exchange, for example at a temperature under the transformation point, the replacement of ions in the glass by smaller ions, such as lithium ions, or at a temperature above the transformation point, the replacement of the ions in the glass by larger ions, such as potassium ions. In order to maintain the temperature of the molten salt baths, electrical heating systems, for example a resistance heater, can be disposed inside the walls of the vessel, but this also influences the flow conditions of the salt bath or salt baths. In addition, means for screening a quantity of molten salt, for example in the form of a lattice or net, can be arranged directly adjoining a surface of the glass object during the hardening treatment in the molten salt baths, which treatment comprises directing flow of the molten salt toward the glass object. The known vessel is thus primarily suitable for receiving salt melts for the chemical hardening of glass objects which are introduced and removed in intermittent operation. The vessel has an inlet for the molten fresh salt bath and an outlet for the spent salt bath enriched with ions issuing from the glass. This known salt bath vessel is thus not suitable as a single unit for a continuous hardening process.

From German Democratic Republic Pat. No. 89,217 is known a device for the continuous treatment of objects of glass or vitrocrystalline material to be hardened in salt melts, which consists of a system of several vessels for receiving a salt melt or several salt melts of different concentration with temperatures of about 500° C. This multi-vessel system is composed of several directly or indirectly heatable salt bath vessels which are arranged in series and connected with each other by an overflow, where one salt bath vessel, preferably the first one after the preheating zone, has a salt bath outlet for the spent salt melt, and one salt bath vessel of the system, preferably the last vessel before the cooling zone, has a salt bath inlet for fresh salt melt supplied from a storage tank.

The heating of the salt bath vessels, and thus of the salt baths, is preferably effected indirectly through the furnace chamber, which is heated, for example, with a resistance heater, or directly by a resistance heater arranged inside the vessel wall. In order to maintain the temperature of the salt melt in the vessel, each salt bath vessel is surrounded by solid walls of refractory material and is thus arranged in a fixed chamber.

The known vessels permit thus by their design and arrangement into a complex, a continuous process of introducing the objects to be treated into the vessel, hardening the objects in the salt bath, and removing the treated objects from the vessel.

A disadvantage of these known vessels for receiving hot molten salt or molten salts is, however, that they cause by their heating system irregular heating and temperature distribution inside the salt bath or salt baths and, thus, irregular flows and ion concentrations inside the bath or baths, and, consequently, irregular hardening of the glass objects.

Besides, due to the relatively rigid arrangement of the vessels in the complex, the vessel complex must be removed if one vessel becomes defective.

Due to the high temperatures of the salt bath melts, there are frequently stresses inside a salt bath vessel caused by irregular heating, which lead to problems including jamming of the vessels in the refractory chambers.

A principal object of the invention is to provide vessels for receiving hot molten salt baths for modifying the properties of objects of glass or vitrocrystalline materials or stoneware or similar materials where the disadvantages of the presently known salt bath vessels are avoided and which ensure by their design, both in the multi-vessel complex and as individual units, the continuous modification of the properties of the objects with the simultaneous introduction and discharge of the molten salt baths and maintenance of certain temperature and ion concentration conditions.

It is, therefore, an object of the invention to provide vessels for hot molten salts, preferably salts for modifying the properties of objects of glass, vitrocrystalline material or stoneware, which consist of several separate units for different salt melts, which are exchangeable independently of the preceding and/or following vessels and which permit by a specially designed heating system and its arrangement inside the vessels a uniform, accurate temperature control and ion diffusion.

From the following description of the invention, other objects and advantages of the invention will be apparent to those skilled in the art.

According to the invention, the vessel for receiving molten salts for modifying the properties of objects of glass, vitrocrystalline material, stoneware or similar materials is double-walled, consisting of an inner vessel and of an outer vessel and the inner vessel is releasably supported in the outer vessel by means of a peripheral flange closing a space between the vessels.

In the space between the inner and outer vessels is arranged a hot gas deflection system for indirect heating, in which the supplied hot gases are so deflected that a uniform temperature control of the salt bath melt is attained in the vessel. Subsequently, the hot gases are led off or circulated. Besides, the vessel according to the invention is characterized in that a feeding and an overflow connection are arranged in the upper part of the inner vessel, the overflow connection being arranged at a level below the feeding connection depending upon the salt bath melt level to be maintained.

The overflow connection is secured in the wall of the vessel by an easily detachable keyed connector, and the feeding connection, which protrudes through an opening into the vessel, is likewise releasably mounted. Several inner and outer vessels arranged side by side in the complex can thus be easily exchanged.

For controlling the temperature, the inner vessel has tubular guides for receiving at least two temperature measuring instruments. The vessel according to the invention is furthermore characterized by the fact that a system of double-T-shaped reinforcing fins is arranged on the outer vessel, which fins support the inner vessel, one reinforcing fin extending vertically on a lengthwise wall between the inner and outer vessel being designed as a sealing intermediate web separating the hot gas circulating system. The reinforcing fins are secured on a continuous supporting bar. Between the inner vessel and the intermediate web a high temperature resistant packing material can be inserted for the precise packing of the two halves of the aforementioned lengthwise wall of the vessel to avoid a short circuit between the hot gas currents.

Also, a baffle plate is arranged on the longitudinal and transverse axis between the inner and outer vessels to subdivide the hot gas current.

Below the baffle plate, which is provided with bores, a runoff chute likewise provided with bores is arranged inclined to a runoff pipe for leaking molten salt issuing in the case of corrosion.

Another feature of the vessel according to the invention is the arrangement of its reinforcing fins which are formed between the inner and outer vessels as guide fins carrying the hot gas current. The system of reinforcing or guide fins is designed as follows for uniform and accurate temperature control of the salt bath or salt baths.

From the hot gas inlet on the upper edge of a front end wall of the vessel the guide fins extend down to the bottom of the vessel and through the bottom to the opposite end wall. On this end wall for the system of the guide fins, the hot gas current is deflected upwardly to a lengthwise wall of the vessel, then downwardly on the half of the lengthwise wall separated by the intermediate web, and again upwardly through the bottom on the opposite lengthwise wall. The guide fins deflect the hot gas current again downwardly in the upper part of this lengthwise wall, carry it through the bottom of the vessel upwardly to the other half of the lengthwise wall separated by the intermediate web, and the hot gas is deflected from here to the hot gas outlet on the front end wall.

Due to this arrangement of the guide fins, the hot gas is so conducted along the vessel walls between the inner and outer vessels that a substantially constant temperature is maintained in the entire hardening treatment temperature range of the salt melt by a rapid equalization of the hot gas and salt bath temperatures. In order to increase the salt bath level or to reduce the salt bath volume, a displacement body consisting of individual stackable segments, can be arranged in the inner vessel. The segments are preferably arranged staggered relative to each other at an angle of 45°, to maintain certain flow conditions by providing continuous channels through which the salt bath can flow.

In order to prevent deformation by heat and stresses in the vessel system, the side walls of the inner vessel are preferably slightly conical. In addition, the inner vessel consists preferably of a thin walled, high alloy, scale, corrosion and heat resistant material.

The vessel according to the invention has at least two skids provided with stiffening ribs and can thus be moved or displaced in the multi-vessel complex on corresponding slide bars independent of its relative position in the arrangement.

Several vessels can be arranged in the complex side by side or in series with staggered feeding and overflow connections.

The advantages of the present invention consist in that it ensures, due to the design of the heating system as a hot gas deflection system provided with guide fins and its arrangement inside the vessel, a uniform temperature control of the salt melt inside the salt bath, a defined ion exchange and a uniform hardening of the objects.

The design of the vessel according to the invention as a double walled vessel consisting of different exchangeable parts, such as the inner vessel, the outer vessel, the feeding and overflow connections, and so forth, permits, on the one hand, assembly into a stable vessel system and, on the other hand, easy replacement of individual damaged parts.

In case of corrosion it is possible to remove individual vessels from a multi-vessel complex system and to replace parts. The defect of an inner vessel is immediately visible by molten leakage salt running off through the runoff chute and the runoff pipes so that the furnace chamber in which the vessels are arranged cannot be damaged.

The invention permits the continuous solidification of glass objects by the arrangement of the vessels according to the invention in a multi-vessel complex system with continuous feed and discharge of the salt baths.

The invention will now be further described by reference to an exemplary, preferred embodiment, as illustrated in the drawings, in which.

Figure 1:
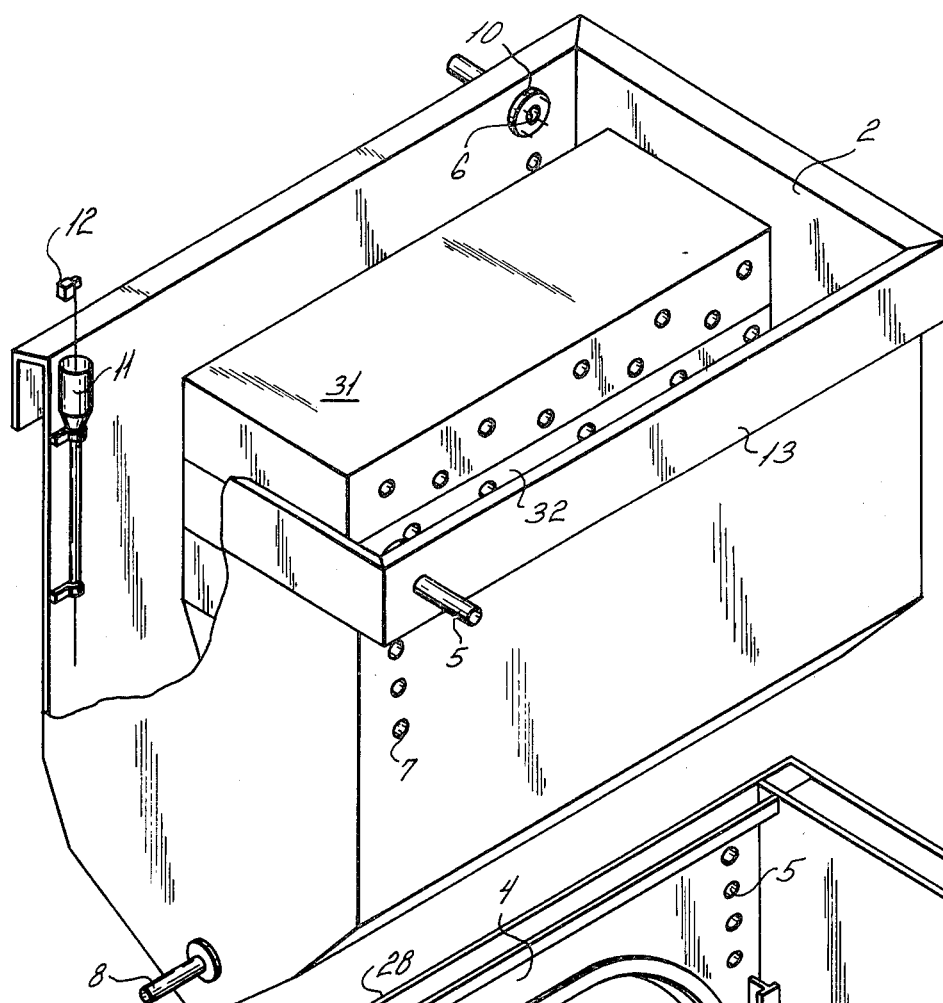
FIG. 1 is a partly cut away perspective view of the inner vessel for receiving the molten salts and provided with a displacement body.
Figure 2:
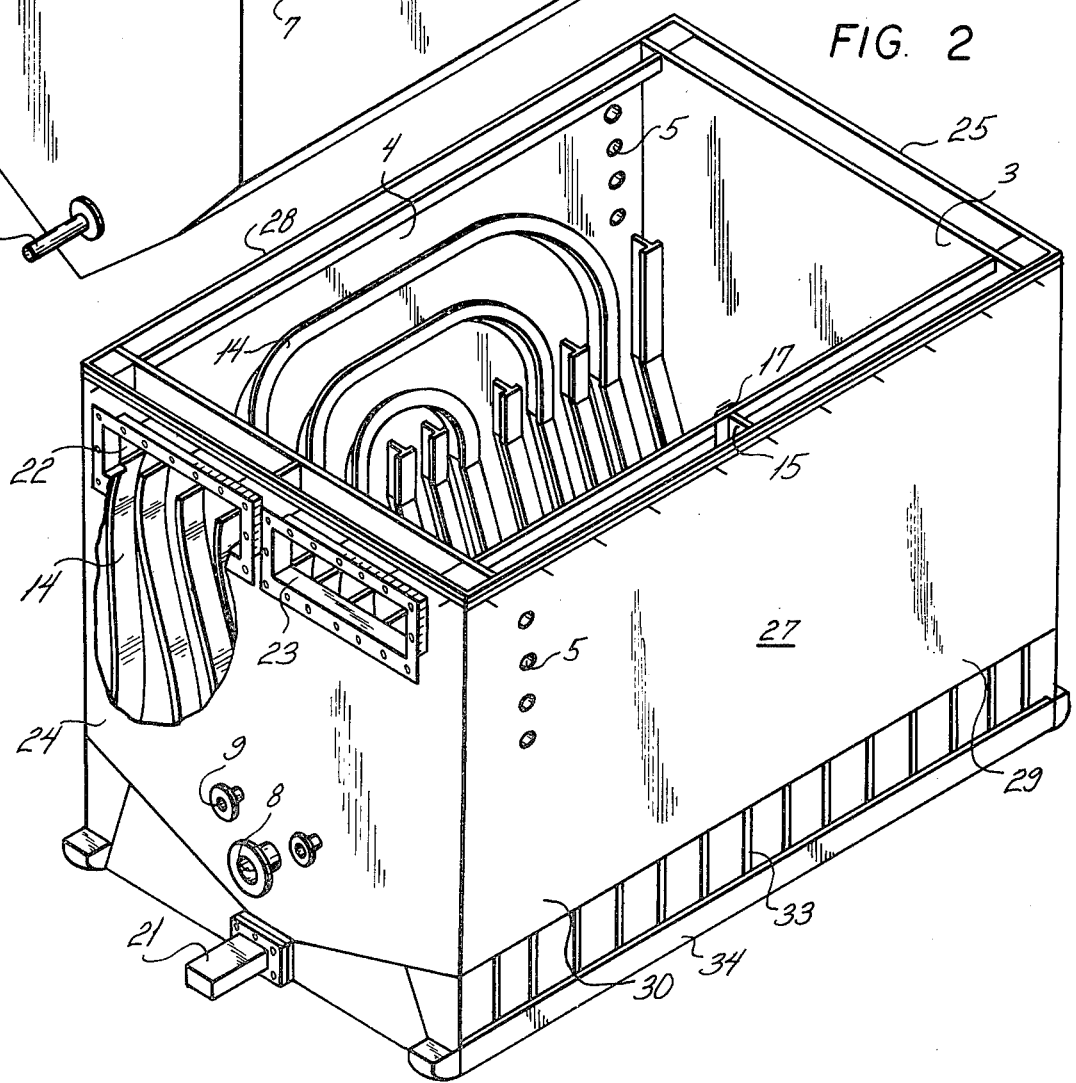
FIG. 2 is a partly cut away perspective view of the outer vessel.
Figure 3:
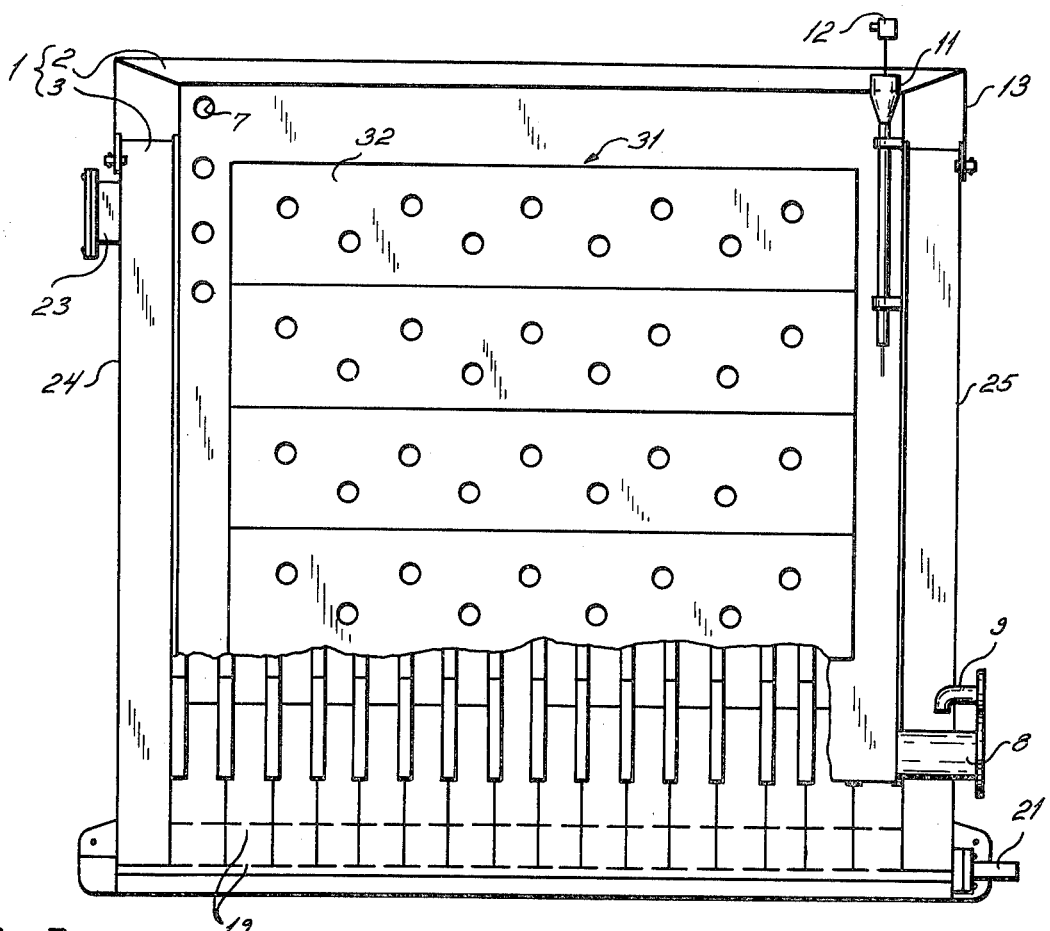
FIG. 3 is a longitudinal section through the entire combined vessel of FIGS. 1 and 2.
Figure 4:
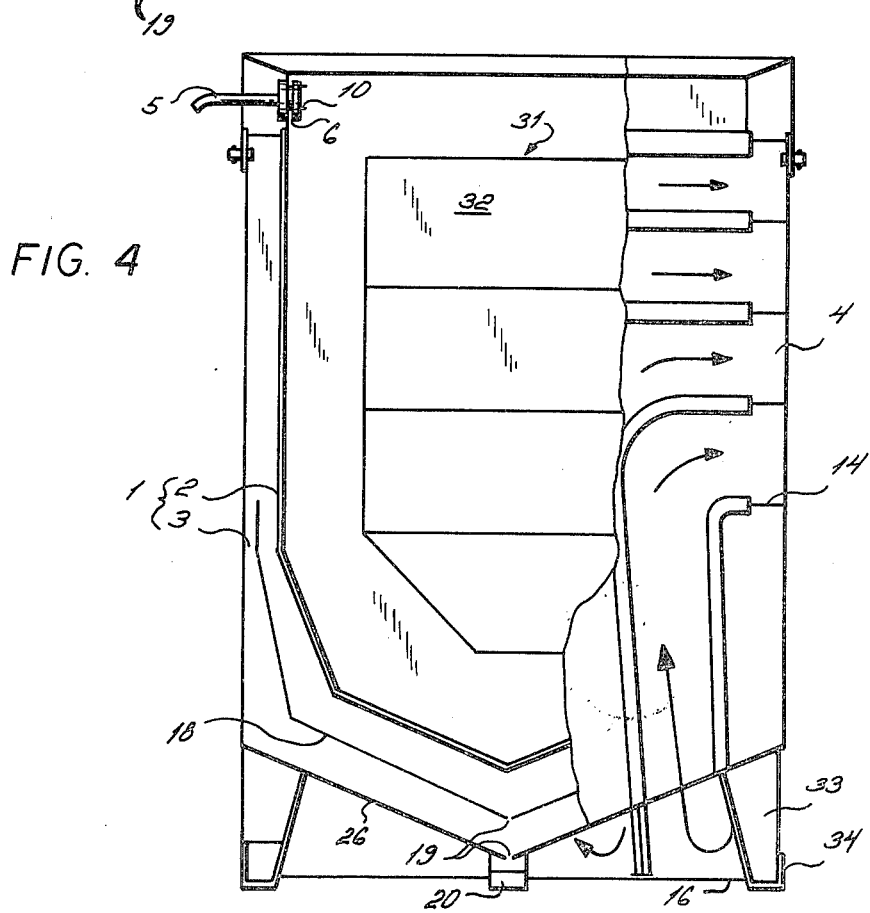
FIG. 4 is a cross section through the entire vessel of FIGS. 1 and 2.

FIG. 1 illustrates the vessel according to the invention for receiving a bath of hot molten salt for the chemical hardening of objects of glass, vitrocrystalline material, stoneware or similar material. The vessel 1 is double walled and consists of an inner vessel 2 and of an outer vessel 3. In the space of this double wall between the inner vessel 2 and the outer vessel 3 is arranged a hot gas deflection system 4 for indirect heating.

In order to avoid as far as possible, on the one hand, a chemical attack by the hot salt melts, e.g., $KNO_3$, $NaNO_3$, $LiNO_3$, on the vessel system, and on the other hand, stresses on the vessel, the inner vessel 2 consists of thin walled, high alloy, scale, corrosion and heat resistant steel. The inner vessel 2 of each vessel 1 has in the upper part a feed connection 5 for the introduction of the molten preheated salt from a melting tank or from a preceding salt bath vessel and an overflow connection 6 corresponding to the level of the salt bath in the vessel and which may be arranged at different levels below the feed connection 5 depending on the arrangement of vessel 1 in the multi-vessel complex system. The feed connection 5 consists of a pipe protruding through an inlet opening 7 of the inner vessel 2.

The overflow connection 6, which is arranged staggered in the multi-vessel system from one vessel to the other at different levels and on opposite lengthwise walls, is secured by an easily detachable keyed union 10 in the lengthwise wall 28 of the vessel 1. This way it is possible, by loosening one or several overflow connections 6 in a multi-vessel system, to exchange individual inner vessels 2, independently of the entire vessel complex. For the discharge of a salt bath from a vessel, the inner vessel 2 has a discharge pipe 8 leading through the outer vessel 3, so that each salt bath can be discharged independently of preceding or following salt baths.

In order to prevent solidification of the salt bath during the discharge, the discharge pipe 8 is surrounded by a heating pipe 9. In order to obtain a uniform hardening of the glass objects by as uniform an ion concentration of the salt bath as possible, the temperature of the heated salt bath and of the hot gases must be constantly checked. This is done by measuring the temperature by means of several temperature measuring instruments 12, preferably thermocouples, which are arranged in tubular guides 11 in the inner vessel 2.

In order to avoid as far as possible stress problems in the vessel system 1, the salt melt is introduced preheated to about 500° C. into the likewise preheated to 500° C. vessel 2. The vessel 2 is connected by an elastic tongue 13 with the outer vessel 3.

For supporting the inner vessel 2, on the outer vessel 3 is arranged a system of double T-shaped reinforcing fins 14 which act at the same time as guide fins for guiding the hot gases for the heating system.

A vertically extending reinforcing fin 14 on the lengthwise wall 27 of the vessel between the inner vessel 2 and the outer vessel 3 is designed at the same time as a sealing intermediate web 15, that is, as a guide fin bearing tightly on the inner vessel 2 and outer vessel 3, so that the hot gas deflection system 4 is separated on the lengthwise wall 27.

Though the inner vessel 2 is supported by the reinforcing fins 14 and is mounted substantially tightly, a partial passage of the hot gases between the inner vessel 2 and the reinforcing fin 14 is still possible. In order to eliminate completely this short circuit from one hot gas current to the other, on the intermediate web 15 of the lengthwise wall 25 of vessel 1, a high temperature resistant packing material 17 is embedded between the inner vessel 2 and the intermediate web 15. The system of reinforcing fins 14 supporting the inner vessel 2 extends between all walls of the vessel 1 vertically to the bottom 26 of the vessel 1, where all fins 14 are secured on a continuous supporting bar 16.

In addition, a baffle plate 18 is arranged between the inner vessel 2 and the outer vessel 3, so that the hot gas system is again subdivided in the longitudinal and transverse axis of vessel 1.

The baffle plate 18 has several small bores 19 through which issuing molten leakage salt passes if the inner vessel 2 has a leak. A runoff chute 20, which is likewise provided with bores for the passage and collection of the leakage salt, is slightly inclined and terminates in a runoff pipe 21 for the runoff of the salt melt. This way it is possible, if the inner vessel 2 becomes defective, to recognize the damage immediately. Since the leakage salt does not run into the furnace chambers as in the known vessels, a leak in vessel 1 does not result in major complications. The hot gas deflection system 4 is so designed that uniform heating of the entire surface of the inner vessel 2 and thus a uniform temperature control of the corresponding salt bath is ensured. The reinforcing fins 14 acting as guide fins are arranged as follows corresponding to the path of the hot gas current between the inner vessel 2 and the outer vessel 3.

On the upper edge of the end wall 24 of the vessel 1 are arranged the hot gas inlet 22 and the hot gas outlet 23. The guide fins 14 extend on this end wall 24 from the hot gas inlet 22 to the bottom of the vessel 1, through the bottom 26 to the opposite end wall 25, and upwardly along the latter. From the end wall 25 the guide fins 14, and thus the hot gas currents, are deflected to the lengthwise wall 27 of the vessel 1 and conducted from there downwardly over one half separated by the intermediate web 15 and through the bottom 26 of the vessel 1 to the opposite lengthwise wall 28. On the lengthwise wall 28 the guide fins 14 are so arranged that the hot gas current rises again, is deflected, travels downwardly, and again through the bottom 26 of the vessel 1, to rise again on the other half 30 of the lengthwise wall 27 of the vessel 1 separated by the intermediate web 15. The guide fins 14, serving at the same time as supporting fins, extend from half 30 of the lengthwise wall 27 to the end wall 24 and extend on the latter to the hot gas inlet 22. During the further course of the hot gas along the guide fins 14 to the hot gas inlet 22, a gradual equalization between the hot gas and the salt bath temperature takes place, so that the temperature is uniform along the lengthwise walls 27, 28 of the vessel 1, that is, the largest surfaces for heat radiation and heat exchange. This has an advantageous effect on the ion concentration and the ion exchange.

When a conveyor means with the glass objects to be hardened passes through a salt bath in the vessel 1, it is possible, for example, to increase the salt bath level or to reduce the salt bath volume in the inner vessel 2, by arranging in the center a displacement body 31, which can consist of individual stackable displacement body segments 32. These segments 32 are preferably filled with air and have continuous pipes staggered at angles of 45° which ensure that the salt melt can circulate substantially uniformly to ensure the desired temperature control and flow of the melt.

Depending on the number and size of the glass objects to be hardened, the displacement body 31 consists of a corresponding number of segments 32 so that the salt bath level can be more or less raised or the volume changed. Naturally, it is also possible to suspend a displacement body from the outside with provision for vertical adjustment thereby to vary the salt bath level or volume.

On the vessel 1 according to the invention are arranged at least two skids 34 provided with reinforcement ribs 33 so that vessel 1 can be moved or displaced on slide bars.

For the continuous hardening of objects of glass, for example by means of a conveyor belt, several vessels 1 are preferably arranged in the complex side by side or in series, with staggered feed and overflow connections 5 and 6.

What is claimed is:

1. Vessel for containing a molten salt for modifying the properties of objects of glass and similar materials and for maintaining that salt in molten form, comprising an inner vessel and an outer vessel elastic peripheral flange means connecting the inner vessel and the outer vessel and closing an intermediate space between the inner and outer vessels, baffle means in said space for guiding a heating gas, means for admitting a heating gas to said space, said baffle means including T-sectioned fins mounted on the inside of the outer vessel for supporting the inner vessel and reinforcing the combined vessel structure, said vessel including a generally upright wall, an upright web extending transversely from the inner to the outer vessel and separating portions of said space within said wall into separate sections, said baffle means constituting means effective to lead heating gas from one of said separate sections to a remote region of said space and then to the other of said separate sections, said baffle means and said web constituting means directing said heating gas about said space in such a way as substantially uniformly to heat said vessel and control the temperature thereof to within close tolerances.

2. Vessel according to claim 1, further comprising a first conduit extending through the outer vessel and communicating with the inner vessel for discharge of the molten substance and a second conduit for conducting heating medium into proximity with said first conduit.

3. Vessel according to claim 2, further comprising an inlet conduit communicating with the interior of the inner vessel for introducing the molten substance into the inner vessel, an outlet conduit communicating with the interior of the inner vessel for controlling the level of the molten substance in the inner vessel and means for releasably connecting the outlet conduit to the inner vessel at any one of a plurality of levels, each of said levels being below the inlet conduit.

4. Vessel according to claim 3, further comprising a high temperature resistant seal interposed between the web and the inner vessel.

5. Vessel according to claim 4, further comprising a baffle plate located in said space and being positioned between the inner vessel and the outer vessel, said baffle plate having openings for distributing the heating gas.

6. Vessel according to claim 5, the outer vessel having a bottom with openings in it for receiving any quantities of the molten substance which leak from the inner vessel, a run-off chute arranged below the openings in the bottom of the outer vessel for receiving the molten substance therefrom and a conduit communicating with the chute for receiving the molten substance from the chute.

7. Vessel according to claim 6, further comprising at least one displacement body positioned in the inner vessel, the displacement body having openings passing therethrough to permit circulation of the molten substance.

8. Vessel according to claim 7, in which the inner vessel contains a plurality of said displacement bodies and said displacement bodies are stacked.

9. Vessel according to claim 6, in which the openings through the displacement body are staggered on centers offset from each other by about 45°.

10. Vessel according to claim 7, in which the openings through the displacement body are staggered on centers offset from each other by about 45°.

11. Vessel according to claim 7, further comprising an inlet and an outlet for the heating gas, both proximate to the upper edge of a first wall of the outer vessel, said fins being arranged to guide the heating gas in said space downwardly from the heating gas inlet to the portion of the space between the respective bottoms of the inner and the outer vessels, upwardly from between said bottoms to the portion of said space adjacent a second wall of the outer vessel, the second wall being opposite the first wall, laterally within the upper third of the space to a portion of the space adjacent a third wall of the outer vessel, the third wall being substantially perpendicular to the first and the second walls, the web being located on the third wall, downwardly on one side of the web and to the fourth wall of the vessel, said fourth wall being opposite the third wall, first upwardly and then downwardly adjacent the fourth wall, back to the third wall, then upwardly on the other side of the web and to the outlet.

12. Vessel according to claim 11, further comprising skids mounted below the bottom of the vessel.

13. In combination, a plurality of vessels according to claim 12, the vessels being connected to each other through the inlet and outlet conduits, and means for facilitating displacement of the vessels on the skids.

* * * * *